June 7, 1938. W. F. GOFF 2,119,623
TIRE VALVE
Filed Sept. 27, 1937 2 Sheets-Sheet 2

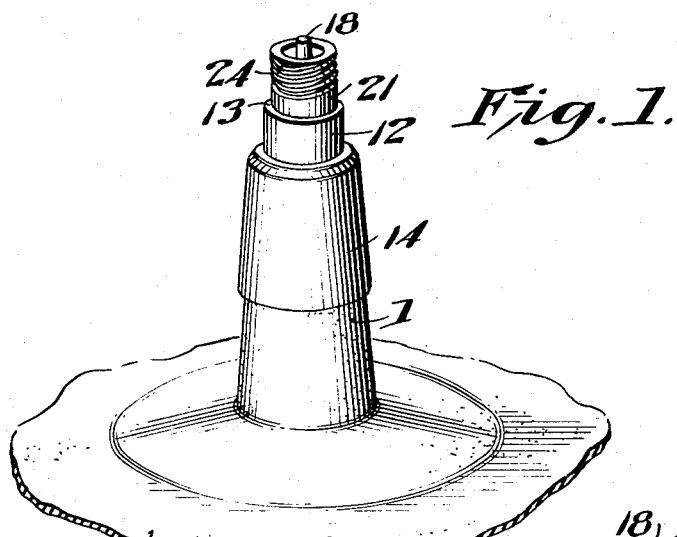
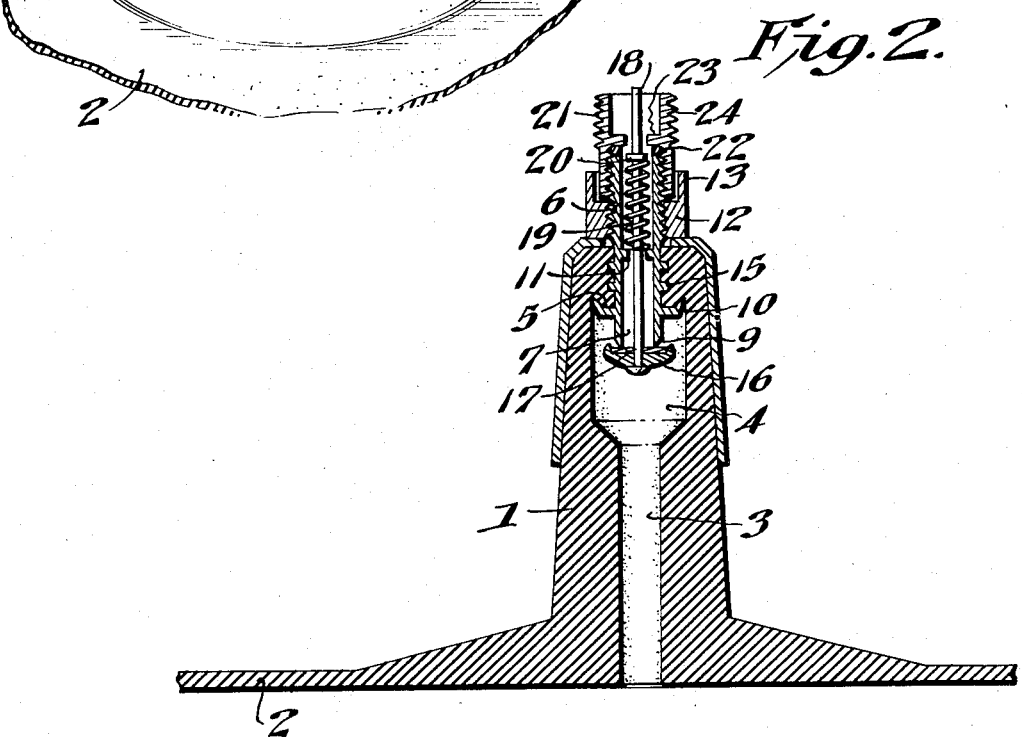

Inventor
William F. Goff
By Lloyd W. Patch
Attorney

Patented June 7, 1938

2,119,623

UNITED STATES PATENT OFFICE 2,119,623

TIRE VALVE

William F. Goff, Akron, Ohio

Application September 27, 1937, Serial No. 165,949

11 Claims. (Cl. 251—144)

My invention relates to improvements in tire valves, and particularly to a valve stem and structure intended and adapted for association and use with a pneumatic tire and in other similar adaptations and connections.

An object is to provide a valve structure of this character which can be readily and cheaply manufactured, and which can be simply and quickly assembled or associated with a pneumatic tire or tube structure without the necessity of cementing or vulcanizing or other special operations, the valve structure as an entirety being thus free to be removed and replaced as may be desirable or necessary.

Another object is to so construct the parts that a metal valve and core structure can be fitted and clamped within a rubber valve stem of a tire, or the like, and the danger and possibility of separation or loosening of the metal from the rubber is avoided and eliminated.

A further object is to provide a device and structure of this character in which the valve parts are carried by and associated with a body or core removably and replaceably assembled, so that replacement of the core will provide an entirely new assembly and valve unit structure.

Another object is to so construct the parts that the rubber stem on the tire or tube or other structure to be inflated can be made and formed as an integral part thereof, and the tire valve portions can be readily and quickly assembled and secured in place by simple operations and without the use of special tools or appliances or the carrying out of special methods or processes.

Yet another purpose is to provide a rubber or yieldable stem portion with an enlargement in the bore thereof forming a shoulder, and to then mount and assemble a valve body or tube in the opening with parts thereof clamping and rigidly holding against the shoulder to thus preclude the possibility of separation and displacement or leakage between the rubber and metal parts.

A still further object is to provide means by which the material of the flexible stem is confined to retain the form and shape of the shoulder so that the valve body tube will be positively held against casual or accidental displacement when the parts are assembled; and, at the same time, the parts can be readily disassembled when desired or necessary.

Still another object is to so construct the parts that to all intents and purposes the completed tire valve and valve stem possesses and retains the usual form and is adaptable for inflation of the tire or other associated means through the usual or ordinary air hose, or other source of air supply, and at the same time the parts are adapted to take the usual valve cap and other ordinary attachments or parts.

A further object is to provide means adaptable to be applied to close the valve stem opening against ingress of mud, dust, moisture, and other foreign matter or substances, and to yet permit free and ready inflation or supply of air, as may be desired.

Yet another purpose is to provide a tire valve and stem structure with which the valve portion is rigidly secured and held in place, and at the same time the stem portion is more or less flexible and yieldable to permit and facilitate ready fitting of the valve stem in place.

With the above and other objects in view, some of which will be hereinafter set forth and others of which are inherent in the construction and association and assembly of the parts and will therefore be apparent to those skilled in the art, my invention includes certain novel features of constructions and combinations and associations and arrangements and assemblies of parts which will be hereinafter set forth in connection with the drawings.

In the drawings:

Figure 1 is a view in perspective showing a tire valve and stem structure made in accordance with my invention.

Fig. 2 is an enlarged longitudinal sectional view.

Figure 3:
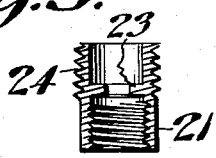
Figs. 3, 4, 5 and 6 are sectional views showing the several metal parts as these appear when disassembled and substantially in their order of assembly.

Heretofore, it has ordinarily been the practice to provide a tubular valve core body of considerable length, which body is then vulcanized, cemented, or otherwise secured in the passage or opening of a rubber valve stem, but with such structures it has ordinarily been necessary to assemble the metal portions and vulcanize these into a rubber valve stem, and then to secure the valve stem upon and in conjunction with a pneumatic tire tube, or the like; and, where vulcanization or other steps tending to adhesively unite metal and rubber have been depended upon, considerable difficulty has been experienced due to the fact that a perfect bond or union cannot be obtained and in consequence the metal portions will loosen to pull out or cause leakage. Further, with such structures it has not been possible to replace all metal parts, and dependence has consequently been had upon attempts to remedy or repair a leaking valve by inserting only a valve inside or core, whereas it has been found that damage often results to the metal parts vulcanized in the rubber stem, which parts are of course not removable and consequently not replaceable or renewable.

With the above in mind, some objects and purposes of my invention are to provide a structure with which the stem can be manufactured and formed to be an integral part of the pneumatic inner tube, or other inflatable portion, the metal parts can be made up simply and inexpensively to be interchangeable, and then the metal parts can be assembled and securely clamped and held in connection with the rubber valve stem by the use of the simplest tools and operations, and without the necessity of vulcanizing, cementing, or resorting to other steps or methods of processes to secure union or adhesion between metal and rubber or unlike materials, prior to attaching this assembly to the tube or other article to be vulcanized. Also, my invention contemplates a construction with which all rubber parts can be manufactured and finished as a completed article, all metal parts can be supplied as interchangeable members, and the metal parts can be assembled with the rubber parts and when once assembled are capable of quick and ready disassembly for entire removal and replacement or renewal of all metal parts, or any such as may be damaged or may be otherwise required to be replaced. Also, my invention accomplishes a rigid and fixedly and rigidly secured and mounted valve structure, while at the same time permitting free and yielding flexibility of the rubber valve stem to permit more ready manipulation of the parts for mounting and demounting or placement and removal of a pneumatic tube or other member having my improved valve structure associated therewith. Other purposes and advantages of my invention will presently appear.

The valve stem 1, which is of rubber or other suitable material, is preferably made tapered from its base to its outer end, and this rubber stem 1 can be molded and formed and vulcanized, or otherwise manufactured, as an integral part of the inner tube 2, or other inflatable article. The rubber stem 1 has a passage or opening 3 therethrough, and adjacent to and spaced back from the outer end of the stem this opening has an enlargement 4 which forms and provides an inwardly faced shoulder 5. To all intents and purposes, the rubber stem 1 can be formed and shaped and constructed to be substantially conventional or usual shape, and in accordance with usual methods or operation, and the passage or opening 3 therethrough will be of sufficient size for full and free flow of air. The enlargement at 4 need not be of relatively much greater diameter than the diameter of the passage 3, and this enlargement can be of various forms and shapes other than shown, the primary purpose being to form or provide the inwardly faced shoulder 5.

The core structure includes a tubular body 6, of metal or other suitable material, and formed or made in any suitable and desired manner, which tubular body is adapted to be fitted in the passage or opening 3 of the rubber stem portion 1 with its inner end extending slightly beyond the shoulder 5, the central bore 7 of this body 6 thus being substantially aligned with the inner part of the passage or opening 3. The outer end of the body 6 is threaded, as at 8, and a valve seat is provided at 9 at the inner end. A flange 10 is provided around the outside of the tubular body 6 adjacent to the inner end and is adapted to be forced through the outer end of the passage 3 as the metal body 6 is fitted in place, so that this flange 10 will be disposed inwardly to engage with the shoulder 5. Within the bore 7, and preferably substantially in the middle portion of the sleeve, a flange 11 is provided to extend inwardly to serve as a spring seat, while yet leaving the passage or bore through the tubular body 6 sufficiently open to freely receive and discharge air when the structure is in use.

A clamping and securing nut 12 is provided to be turned onto the screw threaded portion 8 of the tubular body 6 to draw the flange 10 against the shoulder 5 of the rubber stem, and thus clamp the flange in place to hold the tubular body against casual or accidental displacement. This clamping or securing nut 12 is provided on its outer side with a sleeve portion 13 having its inner wall spaced slightly from the threaded portion 8.

An outer sleeve or ferrule 14, of metal, or other suitable material, is provided to fit snugly over the outer end of the rubber stem 1, and has an opening therethrough to receive the threaded portion 8 of the tubular body 6. When this outer sleeve or ferrule 14 is fitted in place the clamping and securing nut 12 will bear thereagainst to force the sleeve or ferrule tightly in place, and at the same time this sleeve or ferrule forms a solid abutment against which the clamp nut draws to clamp the flange 10 tightly against the shoulder 5. At the same time, the outer sleeve or ferrule 14 prevents expansion of the rubber wall of the stem and serves to hold this portion rigid, while permitting flexing or yielding of the lower portion of the stem freely as may be required or desirable when fitting the stem in place and removing the same with respect to the hole in the wheel rim, or in other connections where the stem may be used. The outer sleeve or ferrule 14 will hold the outer end of the rubber stem 1 against expansion to separate from the tubular body 6 and to prevent withdrawal or displacement of the flange portion, but in some instances it may be found desirable to provide rims or circumferential bead-like forms 15 on the outer side of the body in the portion which is received in the passage of opening 3 of the outer end of the rubber stem 1. Also, it may be found desirable to turn the edge of the flange 10 rearwardly, or to provide a rim or bead portion around this flange to grip and seat within the rubber at the shoulder 5, and thus provide a more secure and more air tight connection.

As has been stated, the outer end of the rubber stem 1 is preferably reduced or tapered, and the outer sleeve or ferrule 14 will be correspondingly shaped. If desired, this sleeve or ferrule might be made of slightly less size than the outer diameter of the corresponding portion of the rubber stem, and thus a tighter fit may be attained as the drawing on of this outer sleeve or ferrule of slightly less size will cause inward displacement of the rubber of the stem 1 and consequently the material of the stem will be under constant tension and force tending to attain and maintain a tight and accurate fit of the parts.

A valve cup 16 is provided with a valve packing 17, made to fit the valve seat 9, and a pin 18 carried by this valve extends substantially centrally through the central bore 7 of the tubular body 6. A valve spring 19 fitted around the pin bears against the spring seat or stop flange 11 at one end, and against a spring stop flange 20 provided on the pin 18, and consequently this spring serves to normally resiliently hold the valve cup 16 with the packing portion 17 thereof closing the central bore 7 at the valve seat 9. By the application of air pressure through the central bore 7 the valve 16 will be unseated to permit flow of the air inwardly, and the valve can also be unseated by applying pressure upon the extending outer end of the valve pin 18.

Part 21 is provided to tighten down upon the threaded end 8, and within the sleeve 13 of the clamping and securing nut 12 to maintain a constant relation of length between upper end of pin 18 and upper or top end of part 21, and to also serve as an extension on the valve assembly to take an air chuck, or other connection through which air or fluid under pressure is to be supplied. A gasket is provided at 22 to insure an airtight connection between the tubular body 6 and this cap portion 21, and also the cap 21 may have associated therewith a valve pin guide flange 23 to aid in holding the valve pin 18, and consequently the valve cup 16, properly centered. This sleeve-like cap 21 is preferably provided with external threads, as at 24, to take or receive the usual valve stem cap, or to permit coupling of an air hose chuck or other air supply connection.

Figure 7:
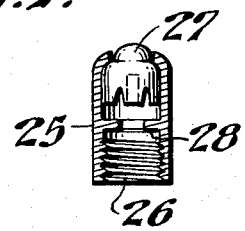
Fig. 7 is a sectional view showing a closing cap.
Figure 4:
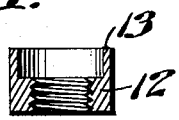
Figure 5:
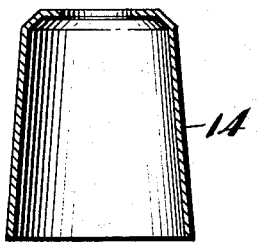

As shown in Fig. 7, a cap 25 can be provided to be fitted in lieu of the sleeve cap 21, and this cap 25 is internally threaded, as at 26, to fit and permanently connect on the threaded end 8 of the tubular body 6. A closure portion or member 27 is held within the cap body against inward displacement by a flange 28, and this closure member has an opening therein to receive the outer end of the valve pin 18. In this adaptation, the valve spring 19 serves the dual function and purpose of closing the valve, and at the same time seating the closure member 27 against the flange rolled inwardly at the outer end of the cap so that the cap 25 and the member 27 will definitely close the valve stem opening against ingress of mud, dust, moisture, or other foreign matter or substances, which might otherwise enter to break the inner seal of the valve and valve packing 16 and 17. It is of course apparent that when an air chuck or other connection for supply of air under pressure is applied upon the cap 25, the pressure of air, or a protruding pin or other appliance of the air chuck or coupling, will force the valve stem and valve inwardly to permit passage of the compressed air.

Figure 8:
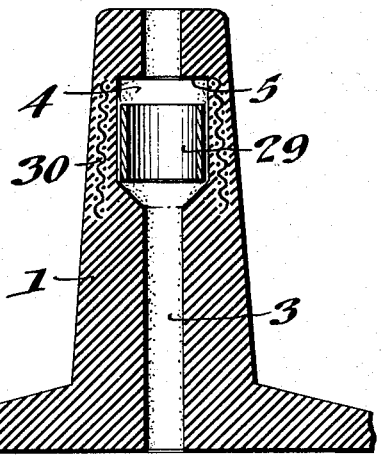
Fig. 8 is a fragmentary sectional view showing a modified form of rubber valve stem.
Figure 6:
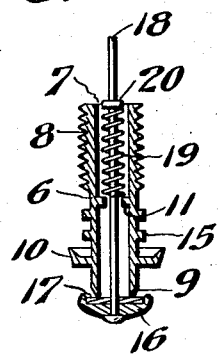

While the structure as hereinbefore described has proved very satisfactory in use, under some conditions it may be found necessary and desirable to reinforce or strengthen the inner wall of the passage or opening 3 through the rubber stem 1, either within the enlargement 4, or in the wall structure per se, and in Fig. 8 of the drawings I have illustrated modifications embodying these features. The sleeve 29, or metal or other suitable material, might be inserted through the outer end of the passage 3 to lie within the enlargement 4, or this sleeve might be fitted upon a mandrel or other form used in shaping the opening, or in fact this rigid sleeve can be inserted in any desired manner. As added reinforcement at this point, fabric or other strands may be introduced into the wall of the rubber stem, as indicated at 30. Obviously, if one expedient for reinforcement or strengthening be employed it may not be necessary to use the other, and in either event the reinforcement will not only strengthen the wall, but will prevent possible collapsing in such manner as might interfere with free movement and action of the valve 16.

As has been stated, the rubber parts, or the stem 1, can be molded or shaped and the passage and enlargement and the shoulder 5 can be formed therein of any desired shape and in any desired manner. Also, the outer end of the passage or opening 3 of the rubber stem 1 can be distended or dilated in any desired manner and by the use of any suitable tool or appliance, to permit passage and insertion of the tubular body 6 and the flange portion 10 thereof.

From the foregoing it will be seen that I have provided a new combination, with a rubber stem, of a removable and replaceable tubular core body having the valve structure unitarily assembled therewith, thus making all metal parts including the body, valve and seat entirely removable and replaceable to permit complete repair should dirt, moisture or other matter, or wear or age harm or destroy the sealing qualities of the seat or valve or other parts. Further, it will be observed that the rubber valve stem and the tube can be made integral, that a safe anchorage and connection between the rubber stem and the metal body and an air tight connection between these parts will be assured at all times and under all conditions; and, that the rubber stem is stiffened and strengthened and reinforced against wear or other damage in its outer part, and yet the flexibility of the stem to permit ready fitting or placement, and also displacement, of the stem through the usual valve stem opening or orifice is permitted and preserved.

While I have herein shown and described the parts as associated with an inner tube of a pneumatic tire, it will be understood that the valve and stem structure are capable of use in other connections, that the valve stem can be made longer or shorter as desired or required, and can be of different shape or configuration, and it will be appreciated that many other changes and variations can be made in the form, construction, arrangement, assembly and association of the parts, without departing from the spirit and scope of my invention.

I claim:

1. A tire valve comprising, a rubber valve stem having a passage therethrough and with the passage enlarged inwardly from the end to provide an inwardly faced shoulder, a tubular valve body inserted in the outer end of the passage and provided with a peripheral flange engaging with the inwardly faced shoulder, said tubular body being externally screw threaded, and a clamp nut turned onto the threaded portion of said tubular body to draw and clamp said flange against said shoulder.

2. A tire valve comprising, a rubber valve stem having a passage therethrough and having the opening thereof enlarged inwardly from its end, to provide an inwardly faced shoulder, a tubular metal body fitted in the outer end of the passage and provided with a peripheral flange to contact with the shoulder of the valve stem, said tubular body being externally screw threaded on its outer end, a sleeve ferrule fitted over the outer end of the rubber valve stem and having the end thereof inturned to approach the threaded end of the tubular body, and a clamp nut fitted on the threaded end of the tubular body and bearing against the inturned end of the sleeve ferrule to draw said flange into anchoring and air tight connection with the shoulder of the rubber valve stem.

3. A tire valve comprising, a rubber valve stem having a passage therethrough and with the passage enlarged inwardly from the end to provide an inwardly faced shoulder, a tubular valve body inserted in the outer end of the passage and provided with a peripheral flange engaging with the inwardly faced shoulder, said tubular body being externally screw threaded, a clamp nut turned onto the threaded portion of said tubular body to draw and clamp said flange against said shoulder, said tubular body being provided with a valve seat at its inner end, a valve stem extending through the opening of said body, a valve carried by said stem adjacent to the valve seat, and a spring on said stem normally resiliently holding said valve in closed position.

4. A tire valve comprising, a rubber valve stem having a passage therethrough and having the opening thereof enlarged inwardly from its end to provide an inwardly faced shoulder, a tubular metal body fitted in the outer end of the passage and provided with a peripheral flange to contact with the shoulder of the valve stem, said tubular body, being externally screw threaded on its outer end, a sleeve ferrule fitted over the outer end of the rubber valve stem and having the end thereof inturned to approach the threaded end of the tubular body, a clamp nut fitted on the threaded end of the tubular body and bearing against the inturned end of the sleeve ferrule to draw said flange into anchoring and air tight connection with the shoulder of the rubber valve stem, said tubular body being provided with a valve seat at its inner end, a valve stem extending through the opening of said body, a valve carried by said stem adjacent to the valve seat, and a spring on said stem normally resiliently holding said valve in closed position.

5. A tire valve comprising, a rubber valve stem having a passage therethrough and with the passage enlarged inwardly from the end to provide an inwardly faced shoulder, a tubular valve body inserted in the outer end of the passage and provided with a peripheral flange engaging with the inwardly faced shoulder, said tubular body being externally screw threaded, a clamp nut turned onto the threaded portion of said tubular body to draw and clamp said flange against said shoulder, and a cap portion turned onto the threaded end of the tubular body to retain the clamp nut in place.

6. A tire valve comprising, a rubber valve stem having a passage therethrough and with the passage enlarged inwardly from the end to provide an inwardly faced shoulder, a tubular valve body inserted in the outer end of the passage and provided with a peripheral flange engaging with the inwardly faced shoulder, said tubular body being externally screw threaded, a clamp nut turned onto the threaded portion of said tubular body to draw and clamp said flange against said shoulder, and a cap fitted at the outer end of the tubular body and having a closure held in closed relation by the valve pin.

7. A tire valve comprising, a tubular valve stem of yieldable material having a passage therethrough and with the passage enlarged inwardly from the end to provide an inwardly faced shoulder, a tubular valve body inserted in the outer end of the passage and provided with an extending flange engaging with the inwardly faced shoulder of the passage, said tubular body being externally screw threaded at its outer end, a sleeve ferrule fitted over the outer end of the valve stem, and a clamp nut turned onto the threaded portion of said tubular body holding said sleeve ferrule on the valve stem and exerting force upon the tubular valve body to tighten and clamp the flange thereof against the shoulder of the valve stem.

8. A tire valve structure comprising, a tubular valve stem of yieldable material having an inwardly faced shoulder within the opening thereof, a valve core body removably fitted within the opening with its outer end extending beyond the stem and having an outwardly faced flange engaging the shoulder, and means on the extending end of the valve core body to draw and clamp said flange against the shoulder.

9. A tire valve structure comprising, a tubular valve stem of yieldable material having an enlargement inwardly from its end providing an inwardly faced shoulder within the opening thereof, a valve core body removably fitted within the opening with its outer end extending beyond the stem and having an outwardly faced flange engaging the shoulder, means on the extending end of the valve core body to draw and clamp said flange against the shoulder, and valve means carried by the valve core body.

10. A tire valve structure comprising, a tubular valve stem of yieldable material having an inwardly faced shoulder within the tubular opening, a valve core body removably fitted within the opening with its outer end extending beyond the stem and having an outwardly faced flange engaging the shoulder, means on the extending end of the valve core body to draw and clamp said flange against the shoulder, and means to strengthen and stiffen the outer end of the valve stem adjacent to the mounting of the tubular body.

11. A tire valve structure comprising, a tubular valve stem of yieldable material having an enlargement inwardly from its end within the tubular opening providing an inwardly faced shoulder, a tubular valve core body yieldably fitted within the tubular opening with its outer end extending beyond the stem and having an outwardly faced flange engaging with the shoulder of the valve stem, a sleeve ferrule fitted around the extending end of the valve core body and engaging the outer end of the tubular valve stem, and means on the extending end of the valve core body to exert clamping force on the valve core body to draw the flange thereof against the shoulder of the valve stem and clamp the intermediate material between said flange and a part of the sleeve ferrule.

WILLIAM F. GOFF.